(12) United States Patent
Dickoff et al.

(10) Patent No.: US 12,158,911 B2
(45) Date of Patent: *Dec. 3, 2024

(54) VIRTUAL LIBRARY

(71) Applicant: Apple Inc., Cupertino, CA (US)

(72) Inventors: Matthew J. Dickoff, San Francisco, CA (US); Jessica Aranda, Santa Clara, CA (US); Patrick Coffman, Cupertino, CA (US); Richard L. Hagy, Montara, CA (US); Stephen J. Rhee, San Jose, CA (US); Nicole R. Ryan, San Francisco, CA (US); Adam C. Swift, Cupertino, CA (US); Gavin B. Thomson, Mountain View, CA (US); Brandon J. Van Ryswyk, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,395

(22) Filed: Apr. 3, 2023

(65) Prior Publication Data
US 2023/0259548 A1  Aug. 17, 2023

Related U.S. Application Data

(63) Continuation of application No. 17/183,071, filed on Feb. 23, 2021, now Pat. No. 11,620,329.

(60) Provisional application No. 63/041,798, filed on Jun. 19, 2020.

(51) Int. Cl.
| | |
|---|---|
| G06F 3/0482 | (2013.01) |
| G06F 16/535 | (2019.01) |
| G06F 16/54 | (2019.01) |
| G06F 21/10 | (2013.01) |

(52) U.S. Cl.
CPC ............ *G06F 16/54* (2019.01); *G06F 3/0482* (2013.01); *G06F 16/535* (2019.01); *G06F 21/10* (2013.01)

(58) Field of Classification Search
CPC ....... G06F 3/0482; G06F 16/54; G06F 16/535
See application file for complete search history.

(56) References Cited

U.S. PATENT DOCUMENTS

| | | | |
|---|---|---|---|
| 8,627,269 B2 * | 1/2014 | Malasky | G06F 9/455 717/121 |
| 10,051,103 B1 | 8/2018 | Gordon et al. | |
| 10,277,601 B1 | 4/2019 | Higgins | |
| 2003/0088582 A1 | 5/2003 | Pflug | |

(Continued)

OTHER PUBLICATIONS

Franziska Roesner et al., "User-Driven Access Control: Rethinking Permission Granting in Modern Operating Systems," 2012, IEEE, 2012 IEEE Symposium on Security and Privacy, pp. 224-238. (Year: 2012).*

(Continued)

*Primary Examiner* — Dino Kujundzic
(74) *Attorney, Agent, or Firm* — BAKERHOSTETLER

(57) ABSTRACT

Described herein are techniques to enable limited access to a photos library by enabling application specific virtual photo libraries. When an application requests access to the photos library, the user can select an option to enable or configure a virtual photos library, and then select specific assets (e.g., photos, videos) within the photos library to be selected for inclusion into an application specific virtual photos library.

20 Claims, 12 Drawing Sheets

(56) References Cited

U.S. PATENT DOCUMENTS

| | | |
|---|---|---|
| 2006/0036568 A1 | 2/2006 | Moore |
| 2013/0339474 A1 | 12/2013 | Picker |
| 2014/0068755 A1* | 3/2014 | King .................. G06F 3/04883 |
| | | 726/19 |
| 2014/0101616 A1 | 4/2014 | Kim |
| 2014/0215391 A1 | 7/2014 | Little |
| 2015/0281284 A1 | 10/2015 | Cho |
| 2016/0205103 A1 | 7/2016 | Lee et al. |
| 2018/0213059 A1 | 7/2018 | Alsina et al. |
| 2019/0166400 A1 | 5/2019 | Andreou |
| 2020/0372140 A1 | 11/2020 | Jaber |
| 2021/0397728 A1 | 12/2021 | Thomson |

OTHER PUBLICATIONS

Marc Stiegler et al., "Polaris: Virus-Safe Computing for Windows XP," 2006, ACM, Communications of the ACM, vol. 49, No. 9, pp. 83-88. (Year: 2006).*

International Search Report and Written Opinion from PCT/US2021/033708, dated Aug. 10, 2021, 13 pages.

* cited by examiner

VIRTUAL LIBRARY

CROSS REFERENCE TO RELATED APPLICATIONS

This application is a continuation of U.S. patent application Ser. No. 17/183,071, entitled "VIRTUAL PHOTOS LIBRARY," filed on Feb. 23, 2021, which claims the benefit of priority to U.S. Provisional Application No. 63/041,798, entitled "VIRTUAL PHOTOS LIBRARY," filed on Jun. 19, 2020, the disclosure of each of which is hereby incorporated herein in its entirety.

TECHNICAL FIELD

This disclosure relates generally to privacy protections on electronic devices. More specifically, this disclosure relates to a system and associated methods of enabling an application specific virtual photos library.

BACKGROUND

A privacy control system provided by an operating system on an electronic device can gate application access to privacy sensitive devices (e.g., camera/microphone) and privacy sensitive data sources (e.g., a photos library). When an application attempts to access a privacy sensitive device or a privacy sensitive data source, the user is prompted to allow or deny the access. The indicated user preference may be persisted by the privacy control system. A drawback to enabling access to a privacy sensitive data source is that access may be granted to the entire data source. For example, if a user allows an application to access a photo database, the application may access all assets within the photo database. Thus, it would be beneficial to enable limited access to a privacy sensitive data source for a limited purpose.

SUMMARY

Embodiments described herein provide techniques to enable application specific virtual photographic libraries that limit the application's view of the system photos library to a specific set of selected assets. Described herein are techniques to enable limited access to a photos library by enabling application specific virtual photos libraries. When an application requests access to the photos library, the user can select an option to enable or configure a virtual photos library, and then select specific assets (e.g., photos, videos) within the photos library to be selected for inclusion into an application specific virtual photos library.

One embodiment provides for a method comprising, on an electronic device having one or more processors and a memory to store a photos library managed by an operating system of the electronic device, receiving a request from an application executing on the one or more processors to access the photos library, in response to the request, configuring virtual photos library for the application, wherein the virtual photos library is a view of the photos library that is specific to the application and includes a first set of multiple assets selected for inclusion in the virtual photos library, and presenting the virtual photos library to the application in response to the request to access the photos library.

One embodiment provides for an electronic device comprising one or more memory devices to store a photos library and instructions, the instructions associated with an operating system and one or more applications, wherein the photos library is managed by the operating system, a display device to display a graphical interface, and one or more processors to execute the instructions. The instructions can cause the instructions cause the one or more processors to receive a first request at the operating system from a first application, the first request is a request to access the system photos library and display a prompt via the graphical interface, the prompt including a first interface element to enable a first virtual photos library for the first application. The first virtual photos library is a view of the system photos library that is specific to the first application.

In response to receipt of a selection of the interface element to enable the virtual photos library for the first application, the electronic device can display an asset selector via the graphical interface, the asset selector to enable the selection of a first set of multiple assets within the photos library, the first set of multiple assets to be added to the virtual photos library for the first application, configure a first filter for the photos library, the first filter associated with the first application, wherein the first filter is to limit access by the first application to the first set of multiple assets, and present a filtered view of the photos library based on the first filter.

Other features of the present embodiments will be apparent from the accompanying drawings and from the Detailed Description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
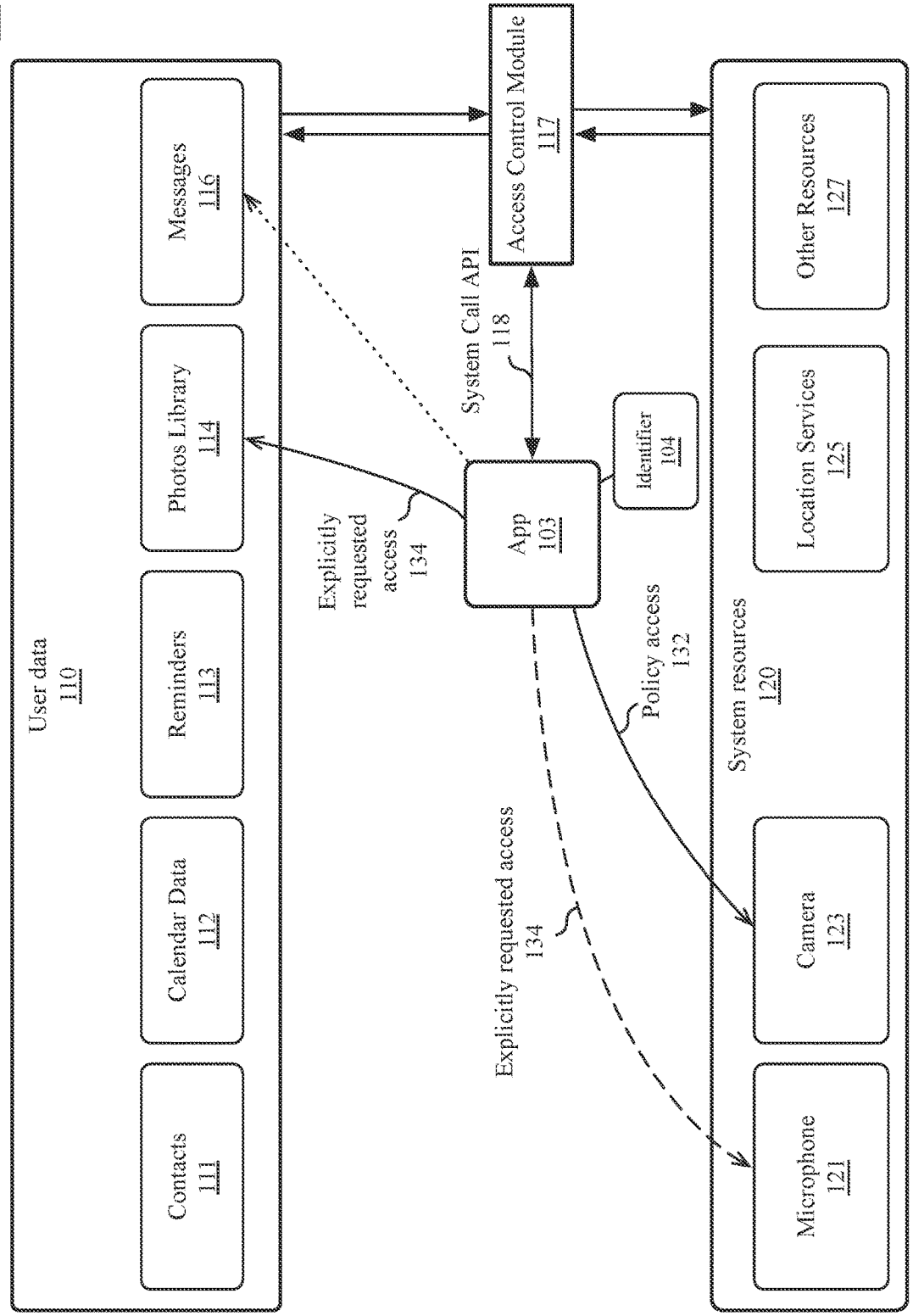
FIG. 1 illustrates an access control system for privacy sensitive data and hardware of a computing device.

Privacy control systems can be used to gate access to private data without user approval. For example, an authorization prompt can be presented the first time an application attempts to access a photos library on an electronic device. However, granting approval for an application to access the photos library grants the application access to the entirety of the photos library. Techniques described herein enable limited access to a photos library by enabling application specific virtual photo libraries. When an application requests access to the photos library on a system, the user can select an option to enable or configure a virtual photos library. An asset selector can be presented that enables the user to select specific assets (e.g., photos, videos) within the system photos library. The selected assets will be included in the virtual photos library for the application. When the application accesses the system photos library, the application will be presented the virtual photos library that is specific to the application. Assets added by the application will be added to the system photos library and the virtual photos library of the application. In one embodiment, applications are not aware that the photos library used by the application is a virtual library. In one embodiment, the programming interface used by the application exposes the virtual state of the virtual photos library and the application can use provided interfaces to directly manipulate the virtual photos library. In such embodiments, applications may also provide their own application specific interface.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions stored on a non-transitory machine-readable medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod touch® devices from Apple Computer, Inc. of Cupertino, California.

FIG. 1 illustrates a system 100 in which access restrictions are imposed on privacy sensitive data of a user. The system 100 includes user data 110 and system resources 120 that can be accessed by an application 103. In one embodiment, access to user data 110 and system resources 120 of a privacy sensitive nature are mediated by an access control module 117. User data 110 that is privacy sensitive can be grouped into different classifications including, but not limited to contacts 111, calendar data 112, reminders 113, a photos library 114, and messages 116, where the messages can include text (e.g., SMS) messages, email messages, and/or instant messages via an instant messaging application. System resources 120 that are privacy sensitive include but are not limited to a microphone 121, a camera 123, location services 125, and other resources 127, which can include software resources, hardware resources, or a combination thereof. Access to the user data 110 can be mediated on a per-classification level. Access to system resources 120 can be mediated on a per-resource level. Various additional types of privacy sensitive information can be protected by the system 100, including but not limited to message history, web browser data (e.g., browser history, cookie data, etc.), system backup data, and any type of location history data that may be stored by the system 100.

In one embodiment, the access control module 117 is a system daemon through which an application 103 can communicate with via a system call application programming interface (API 118), such as an inter-process communication (IPC) call. The application includes an identifier 104 that is used to identify the application to the access control module 117. In one embodiment, the identifier 104 is a universally unique identifier. In one embodiment, the identifier 104 is unique per-system. In one embodiment the identifier 104 is unique per-user.

An application 103 can be provided access to a limited set of resources by default. This default access can be a policy-based access (e.g., policy access 132) that is granted to the application 103 based on the standard functionality of the application. For example, if application 103 is a first-party camera application, the application 103 can be given policy access 132 to a camera 123 and photos library 114 based on a policy associated with the application 103. Third-party camera applications may be required to explicitly request access 134 to one or more of the microphone 121, camera 123, and/or photos library 114. The system 100 can be configured to disallow access to privacy sensitive system resources by default, except for those to which the application 103 is granted policy access 132. In one embodiment, before the application 103 is granted access to user data 110 or system resources 120 outside of policy, the access control module 117 can trigger a graphical interface prompt by which a user of the system can explicitly grant or deny access to the classification of user data 110 or system resources 120. For example, before application 103 can access the photos library 114 of a user, the application 103 performs a call through the system call API 118 to the access control module 117 to explicitly request access 134.

Figure 2:
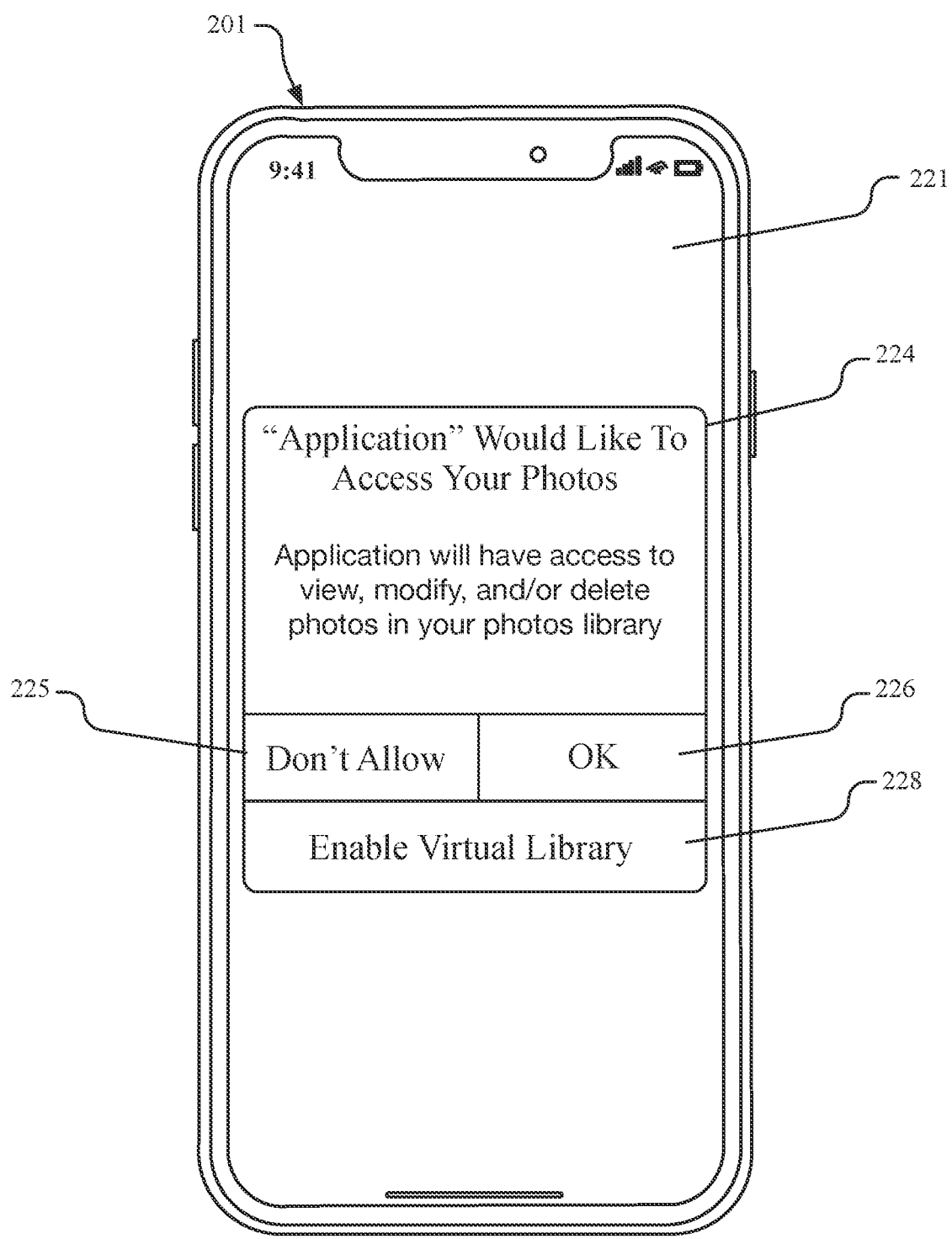
FIG. 2 illustrates an access control prompt is presented for a photos library of a computing device.

FIG. 2 illustrates an access control prompt presented for a photos library of a computing device. When an application attempts to access privacy sensitive hardware on the electronic device 201, the operating system can display a prompt 224 on a display 221 of the electronic device 201. As illustrated, the prompt 224 indicates that an application is requesting access to the photos library of the electronic device 201. A first interface element 225 may be presented that enables the user to block ("don't allow") access to the pasteboard. A second interface element 226 may be presented to allow ("OK") the application unfiltered access the photos library 114. Once the application is granted access to the photos library, the application can access all photos in the photos library unless access is revoked. As described herein, a third interface element 228 can be presented to enable the user to select an option to enable or configure a virtual photos library. An interface can then be presented to enable the user to select specific photographic assets (e.g., photos, videos) within the photos library 114 to be selected for inclusion into an application specific virtual photos library.

Figure 3:
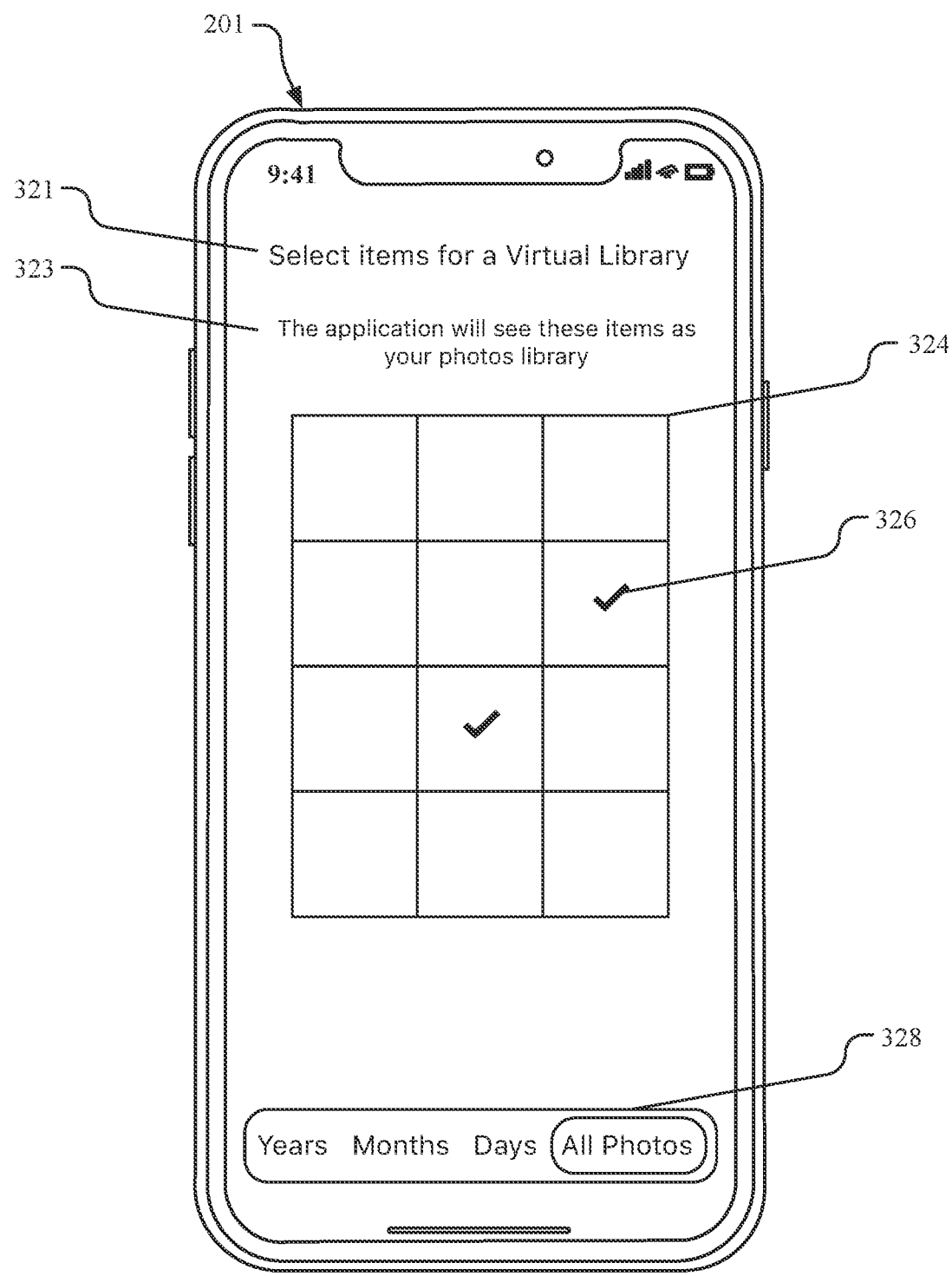
FIG. 3 illustrates a graphical interface to enable the selection of photographic assets for a virtual photos library for an application.

FIG. 3 illustrates a graphical interface to enable the selection of photographic assets for a virtual photos library for an application. The photographic assets are images and videos that are captured by or stored on the electronic device 201. The electronic device 201 can present a user interface that enables a user to select photographic assets to include within a virtual photos library. Interface element 321 can be presented on the graphical interface that identifies the graphical interface. Interface element 323 can be presented to describe the functionality of the interface and inform the user that the selected items will be visible to the application as the virtual photos library of the application. Interface element 324 can present a set of asserts within the photos library of the electronic device 201. Interface element 326 can be displayed over an asset that has been selected for inclusion within the photos library. Interface element 328 can be presented to allow the user to change the time scope of the assets that are presented within interface element 324. In one embodiment, the graphical interface elements of FIG. 3 are provided by an operating system of the electronic device 201. In one embodiment, an API is provided to enable an application to display an interface that is specific to that application. The graphical interface elements of FIG. 3 can be presented to enable the creation of a new virtual photos library of the re-configuration of an existing virtual photos library.

Figure 4:
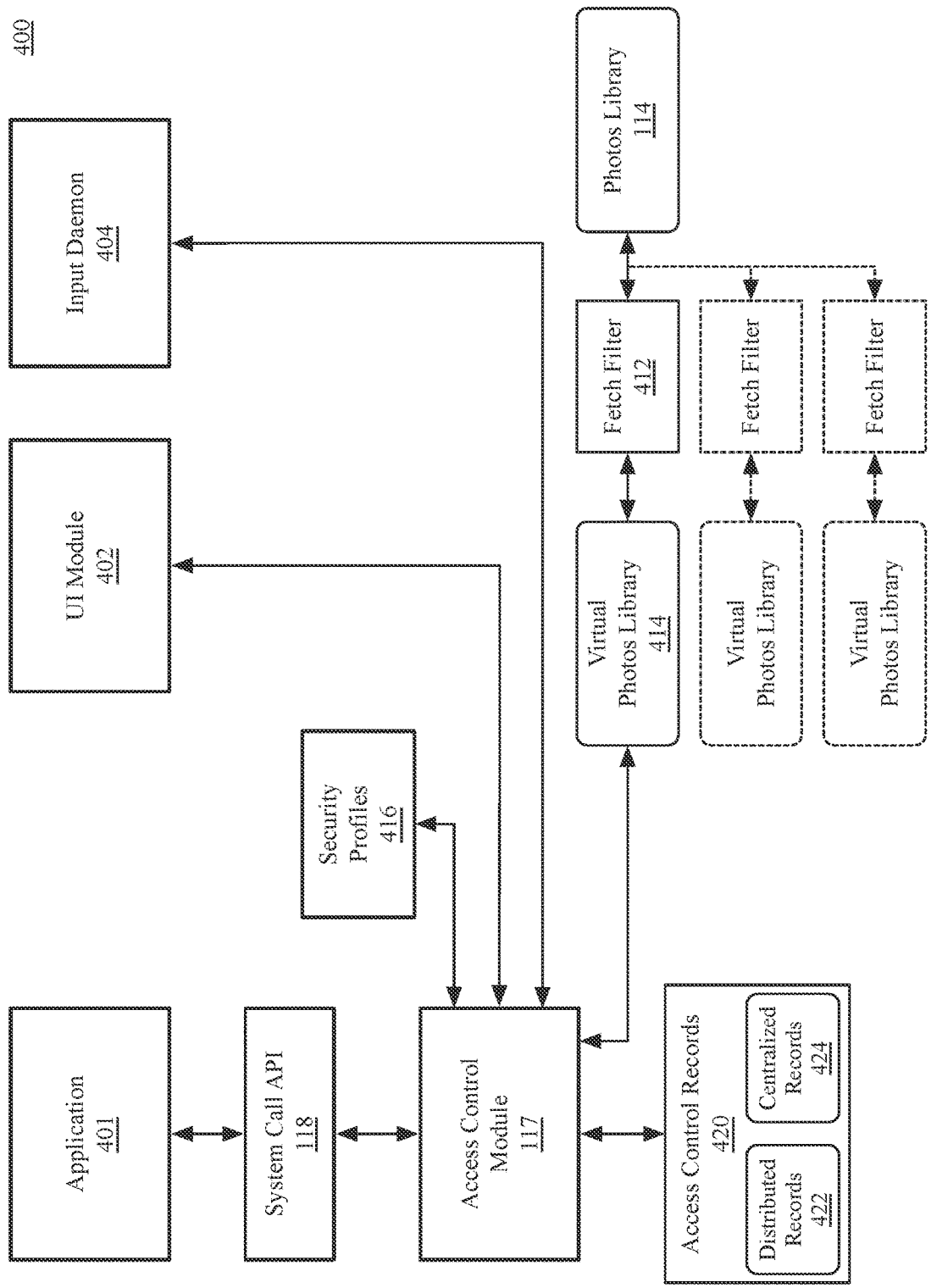
FIG. 4 illustrates system to enable per-application virtual photo libraries.

FIG. 4 illustrates system 400 to enable per-application virtual photo libraries. The system 400 can represent software and hardware on a computing device, such as, but not limited to, a desktop, laptop, tablet computer, mobile phone (e.g., smartphone), wearable device, personal digital assistant (PDAs), media player, gaming device, television or television set-top box, smart appliance, and/or smart speaker device. Software components of the system 400 can be instructions that are executed by one or more processors (e.g., application processors, system processors, sensor processors, always-on processors, etc.) or firmware that is executed by one or more microcontrollers.

In one embodiment, software on the system 400 includes an application 401 that is communicatively coupled via the system call API 118 to the access control module 117. The application 401 can communicate via the system call API 118 to the access control module 117 to gain access to resources such as privacy sensitive user data or system resources. Default access for certain resources may be provided to the application 401 via security profiles 416. A security profile for an application can be dynamically generated by compiling a set of one or more rules that specify resources to which an application can access.

Upon access by the application 401 to a privacy sensitive resource, such as a photos library 114, the access control module 117 can trigger a UI module 402 to display a dialog prompt that requests a user to explicitly grant or deny access to a resource, such as prompt 224 of FIG. 2. A record of access status can be recorded for the resource based on the response provided via the UI module 402. The response provided vis the UI module 402 can be detected vis the input daemon 404, which detects and responds to input events, such as a touch input received via a touch screen display or an input event received via a physical keyboard.

In some embodiments, the system 400 can maintain access control records 420 that record access decisions on a per-user basis, with each user on the system having a separate record instance. In one embodiment the access control records 420 identify a resource for which the user has permitted or denied access, as well as the specific application or process that triggered the access request. In one embodiment, the access control records 420 can store an unknown status for some resources, which can indicate that no prompt results or rights delegation has been recorded for the resource.

In one embodiment the access control records 420 include distributed records 422 and centralized records 424. Distributed records 422 are used to persist access that was previously granted or denied to data files or folders. In one embodiment, distributed records 422 can be stored in extended file system data for files or folders containing user data. For distributed records 422, if a file or folder for which a record exists is deleted, in one embodiment the portion of the distributed records 422 associated with that file or folder can also be deleted. Centralized records 424 can be stored in a central database for each user and can be used specifically to record the results of an access request for a system resource, such as the photos library 114.

In one embodiment a single central photos library 114 is virtualized into a virtual photos library 414 on a per-application basis. The photos library 114 can store photographic assets, such as photographic images or videos that are captured by or stored on the electronic device associated with the system 400. The virtual photos library 414 is enabled using a fetch filter 412 to filter assets within the photos library 114 on a per-application basis. The fetch filter 412 can block access to all assets in the photos library except for those assets explicitly listed by the fetch filter 412. Multiple fetch filters can be configured to enable multiple virtual photos libraries.

A user can add assets to the fetch filter 412 by selecting those assets when creating the virtual photos library 414. In scenarios where the API allows the application 401 to be aware of the use of the virtual photos library 414, the application 401 itself can manipulate the virtual photos library 414 via APIs that enable the user to modify the virtual photos library associated with the application. If the application 401 is not aware that the application is using a virtual photos library, system utilities can be used to enable the user to configure the virtual photos library 414 for the application 401. The user can use system utilities to edit the virtual photos library associated with an application at any time.

Figure 5:
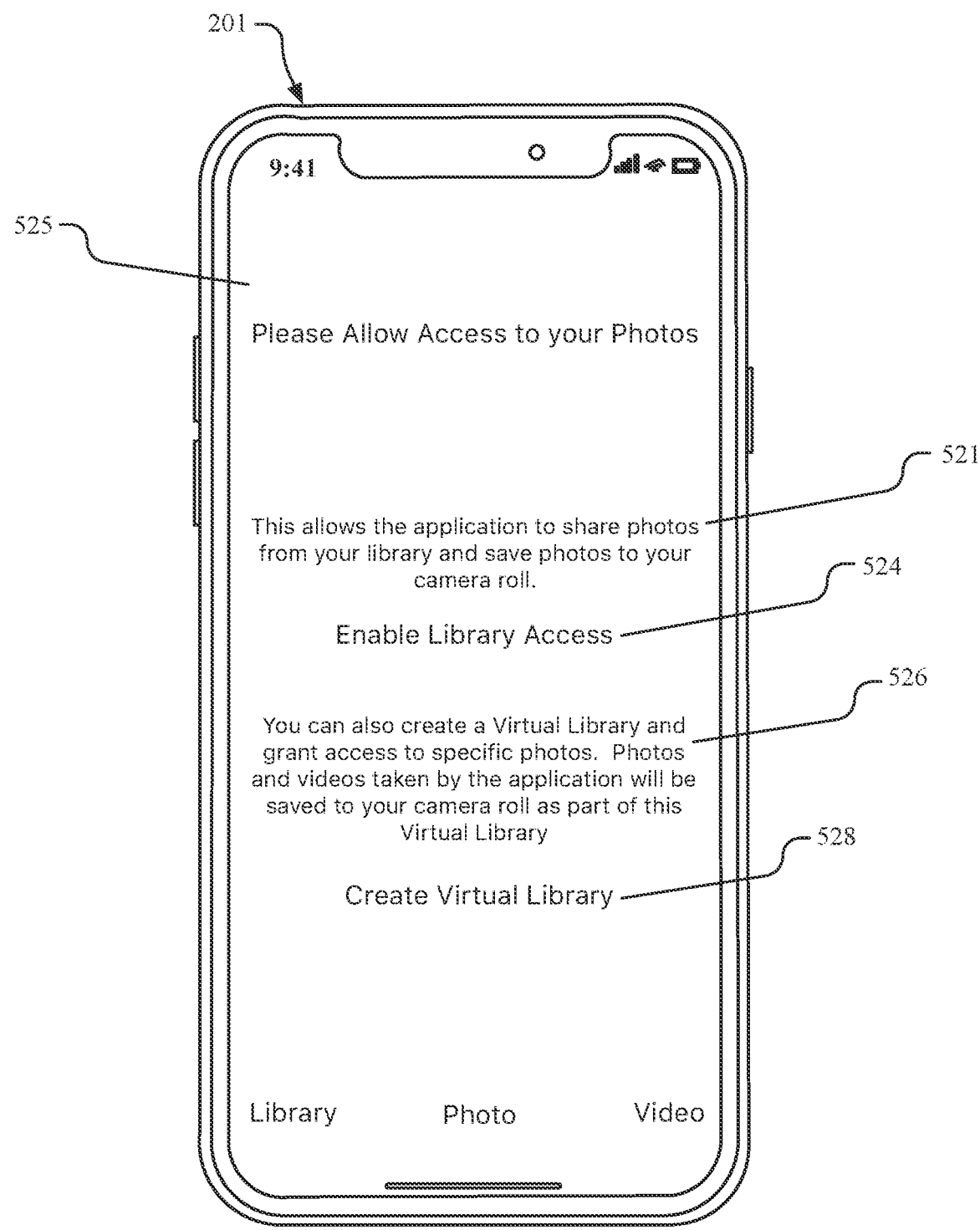
FIG. 5 illustrates a graphical interface to at an application to create a virtual photos library.

FIG. 5 illustrates a graphical interface to at an application to create a virtual photos library. In one embodiment a third-party application can interface with the virtual photos library API and present a user with the option to either enable access to the system photos library or create a virtual photos library. A third-party application that executes on the electronic device 201 can present a graphical interface 525 on a display of the electronic device. The graphical interface 525 can include interface element 521 that presents text to explain the features that are enabled when access to the photos library is granted to the application. The graphical interface 525 can include interface element 524 that, when selected, enables the application to access the photos library. When interface element 524 is selected, a version of prompt 224 of FIG. 2, can be displayed. The prompt that is displayed may or may not present the option to enable a virtual photos library in addition to the option to allow access to the photos library. The graphical interface 525 can also include interface element 526, which explains the option to create a virtual photos library for the application. The explanatory text can indicate that selected photos will appear as the photos in the photos library and that photos and videos taken with the application will appear in the virtual photos library for the application. Interface element 528 can be presented to trigger the creation of the virtual photos library. Upon selection of interface element 528, an interface similar to the interface shown in FIG. 3 can be presented to enable assets for the virtual photos library to be selected.

Figure 6:
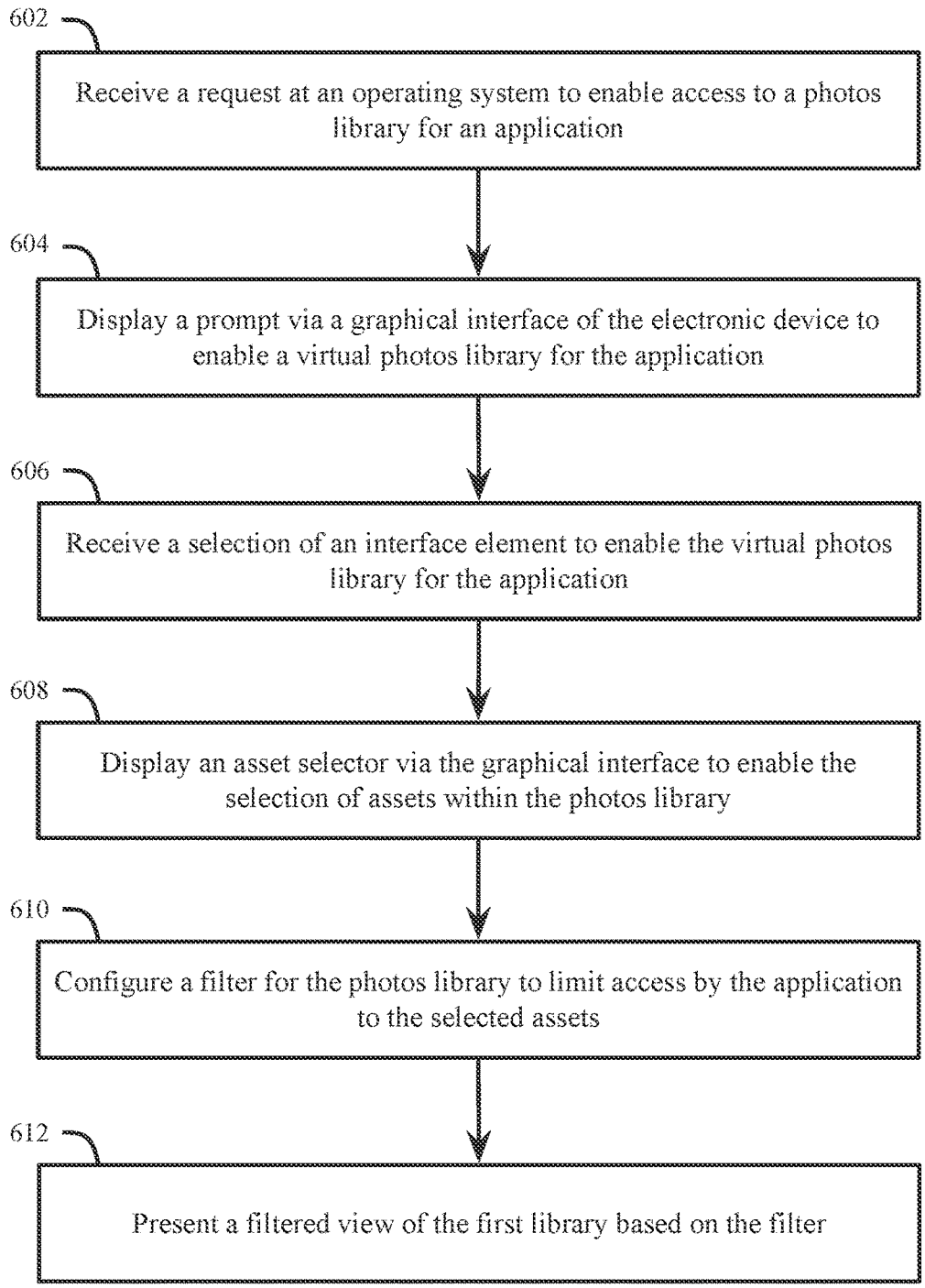
FIG. 6 illustrates a method to enable a virtual photos library for an application.

FIG. 6 illustrates a method 600 to enable a virtual photos library for an application. Method 600 can be implemented by components of an electronic device as described herein, including hardware and software of the electronic device. In one embodiment, method 600 is implemented by components of system 400 of FIG. 4. An electronic device as described herein can include one or more memory devices that are configured to store a photos library, as well as instructions associated with an operating system and one or applications that execute on the electronic device. The photos library can be managed by the electronic device. Method 600 includes for logic for such electronic device to receive a request at the operating system from an application to access the photos library (602). The logic can then display a prompt via the graphical interface of the electronic device to enable a virtual photos library for the application (604). The virtual photos library to be created is a view of the photos library that is specific to the application. The logic can then receive selection of an interface element to enable the virtual photos library for the first application (606). In response to receipt of the selection, the logic can display an asset selector via the graphical interface to enable the selection of assets within the photos library (608). Using the selected assets, the logic can configure a filter for the photos library to limit access by the application to the selected assets (610). The logic can then present a filtered view of the photos library based on the filter (612). The logic can also present selected assets to the application in response to the initial request to enable access to the photos library. Alternatively, the filtered assets may be presented in response to an additional request to read the photos library.

Figure 7:
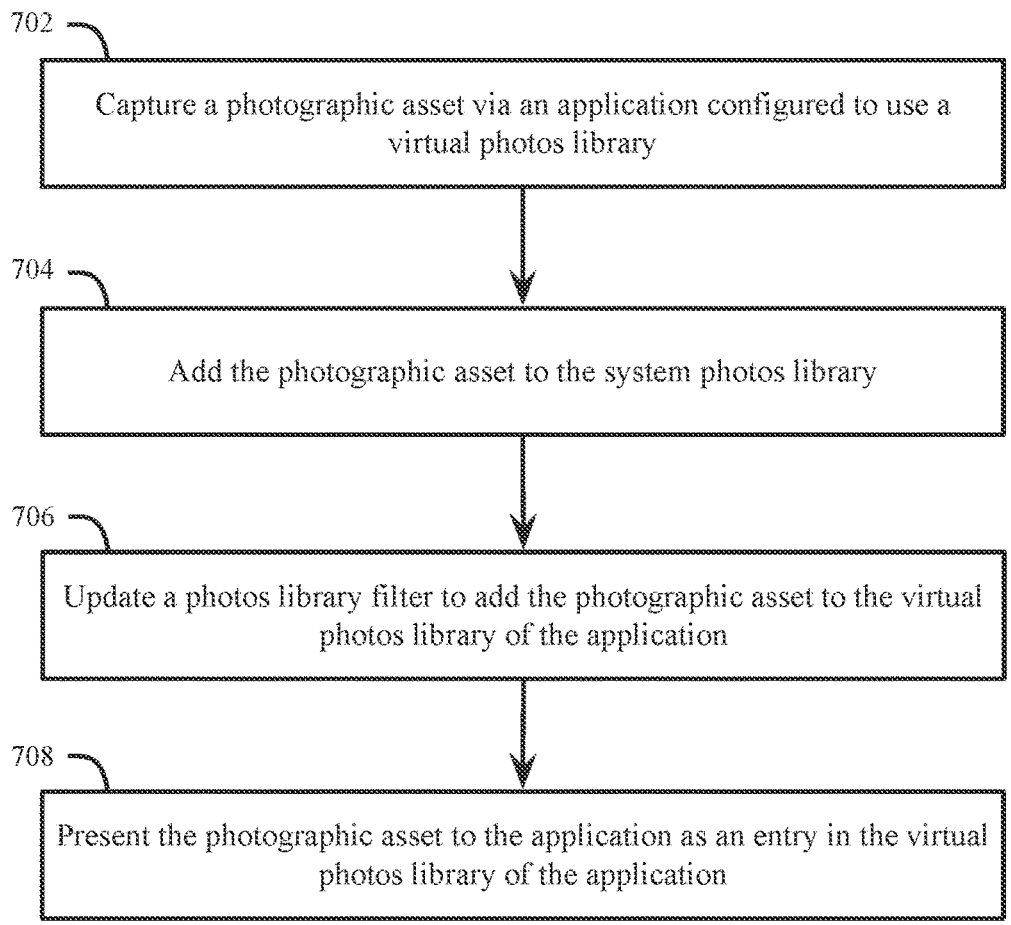
FIG. 7 illustrates a method to enable adding new assets to a virtual photos library for an application.

FIG. 7 illustrates a method 700 to enable adding new assets to a virtual photos library for an application. According to method 700, an application that is configured to use a virtual photos library is can automatically add new photographic assets to the virtual photos library of the application when the application is used to capture those photographic assets.

On an application having a previously configured virtual photos library, method 700 includes for logic on an electronic device to capture a photographic asset via an application configured to use a virtual photos library (702). The logic can then add the photographic asset to the system photos library (704). The logic can then update a photos library filter to add the photographic asset to the virtual photos library of the application (706). The logic can additionally present the photographic asset to the application as an entry in the virtual photos library of the application (708).

Additional Exemplary APIs and Computing Devices

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g., the provider of a software library) or creator of the another set of APIs.

Figure 8:
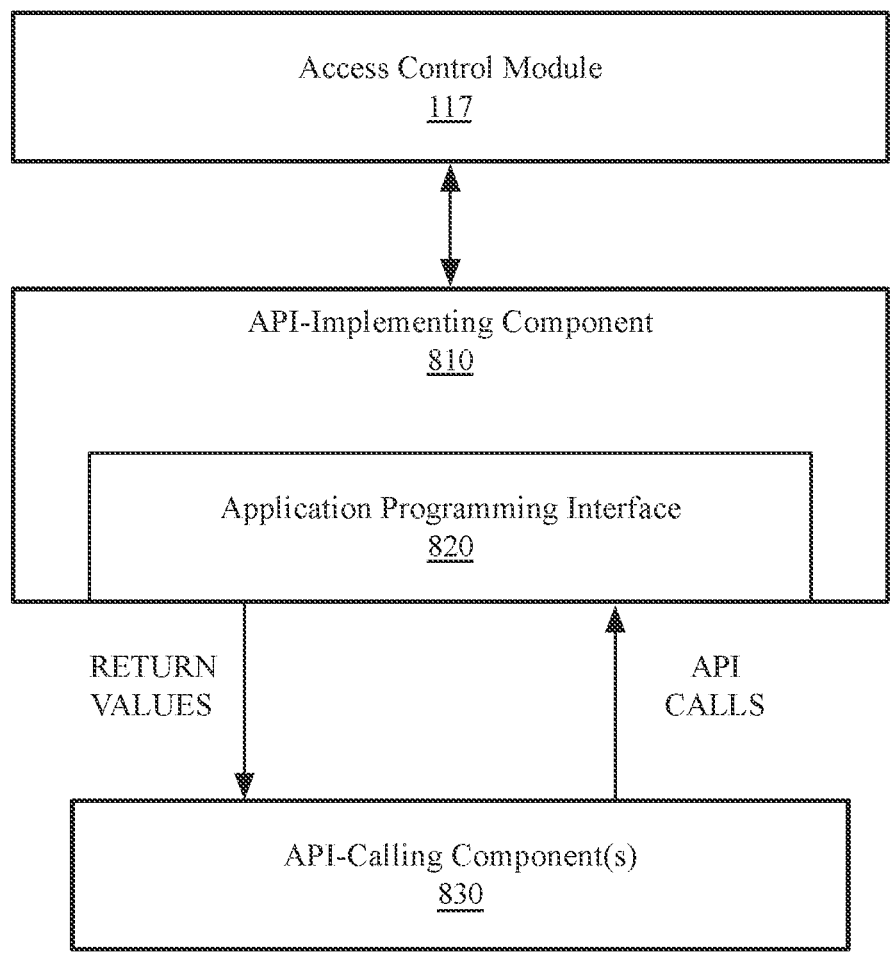
FIG. 8 is a block diagram illustrating an exemplary API architecture, which may be used in some embodiments of the invention.

FIG. 8 is a block diagram illustrating an exemplary API architecture, which may be used in some embodiments of the invention. As shown in FIG. 8, the API architecture 800 includes the API-implementing component 810 (e.g., an operating system, a library, a device driver, an API, an application program, software or other module) that implements the API 820. The API 820 specifies one or more functions, methods, classes, objects, protocols, data structures, formats and/or other features of the API-implementing component that may be used by the API-calling component 830. The API 820 can specify at least one calling convention that specifies how a function in the API-implementing component receives parameters from the API-calling component and how the function returns a result to the API-calling component. The API-calling component 830 (e.g., an operating system, a library, a device driver, an API, an application program, software or other module), makes API calls through the API 820 to access and use the features of the API-implementing component 810 that are specified by the API 820. The API-implementing component 810 may return a value through the API 820 to the API-calling component 830 in response to an API call.

It will be appreciated that the API-implementing component 810 may include additional functions, methods, classes, data structures, and/or other features that are not specified through the API 820 and are not available to the API-calling component 830. It should be understood that the API-calling component 830 may be on the same system as the API-implementing component 810 or may be located remotely and accesses the API-implementing component 810 using the API 820 over a network. While FIG. 8 illustrates a single API-calling component 830 interacting with the API 820, it should be understood that other API-calling components, which may be written in different languages (or the same language) than the API-calling component 830, may use the API 820.

The API-implementing component 810, the API 820, and the API-calling component 830 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

In one embodiment, the access control module 117 described herein can be communicatively coupled with the API-implementing component 810 to mediate access to privacy related system resources such as the user data and system resources illustrated in FIG. 1. Before the API-implementing component 810 can perform some operations, the API implementing component 810 can communicate with the access control module 117 to determine if such operations can be performed.

Figure 9A:
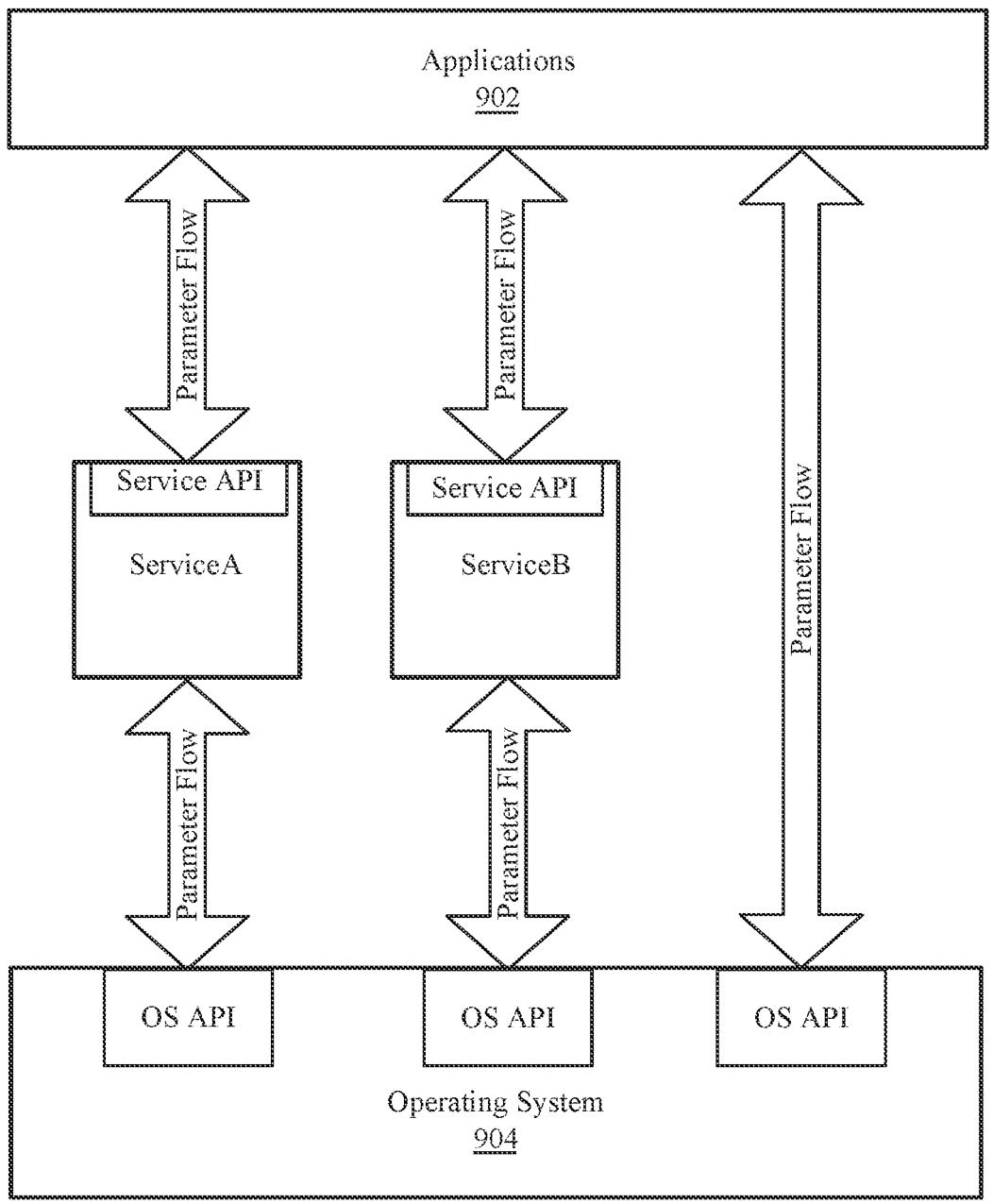
FIG. 9A-9B are block diagrams of exemplary API software stacks, according to embodiments.
Figure 9B:
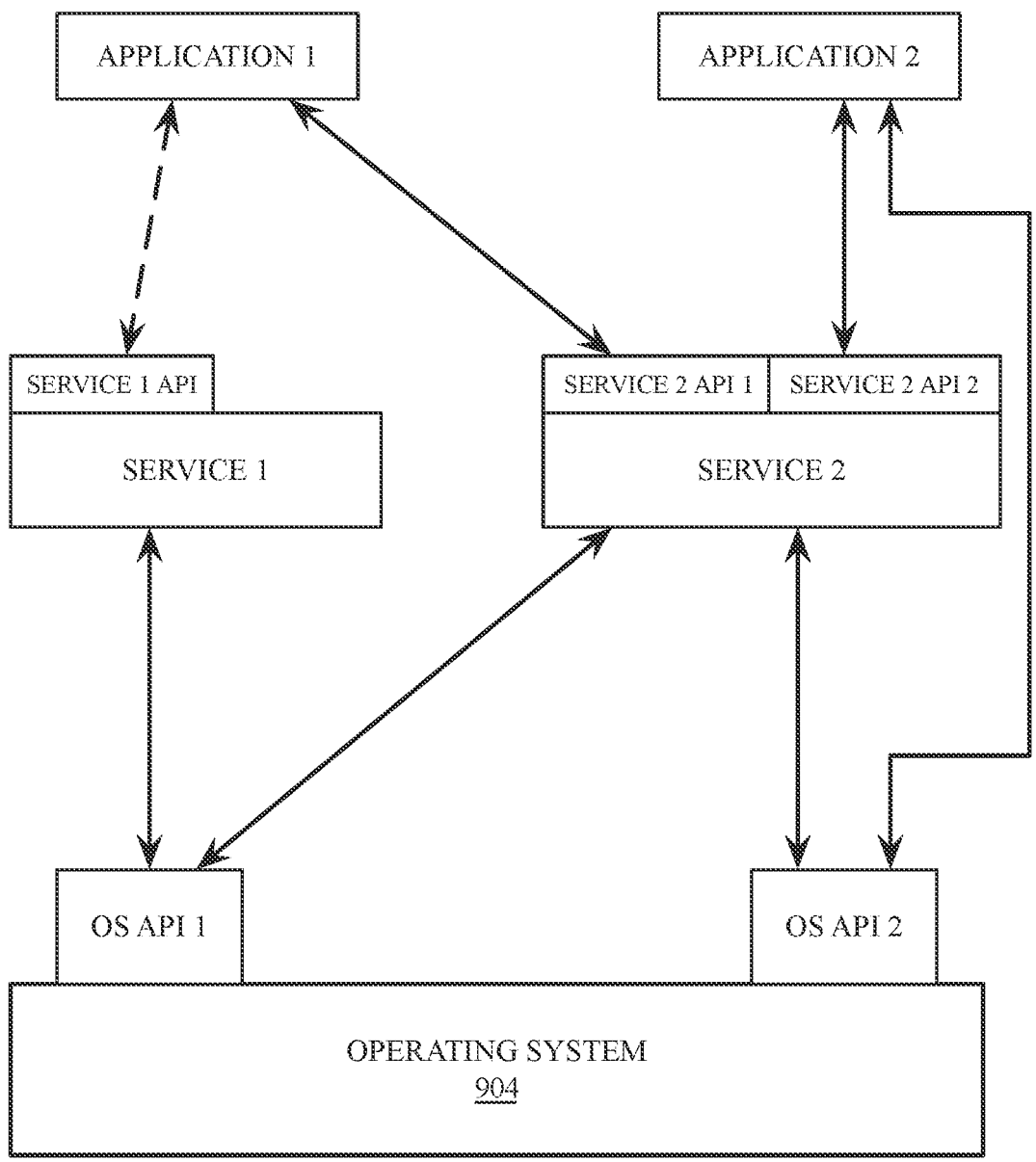

FIG. 9A-9B are block diagrams of exemplary API software stacks 900, 910, according to embodiments. FIG. 9A shows an exemplary API software stack 900 in which applications 902 can make calls to Service A or Service B using Service API and to Operating System 904 using an OS API. Additionally, Service A and Service B can make calls to Operating System 904 using several OS APIs.

FIG. 9B shows an exemplary API software stack 910 including Application 1, Application 2, Service 1, Service 2, and Operating System 904. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 10:
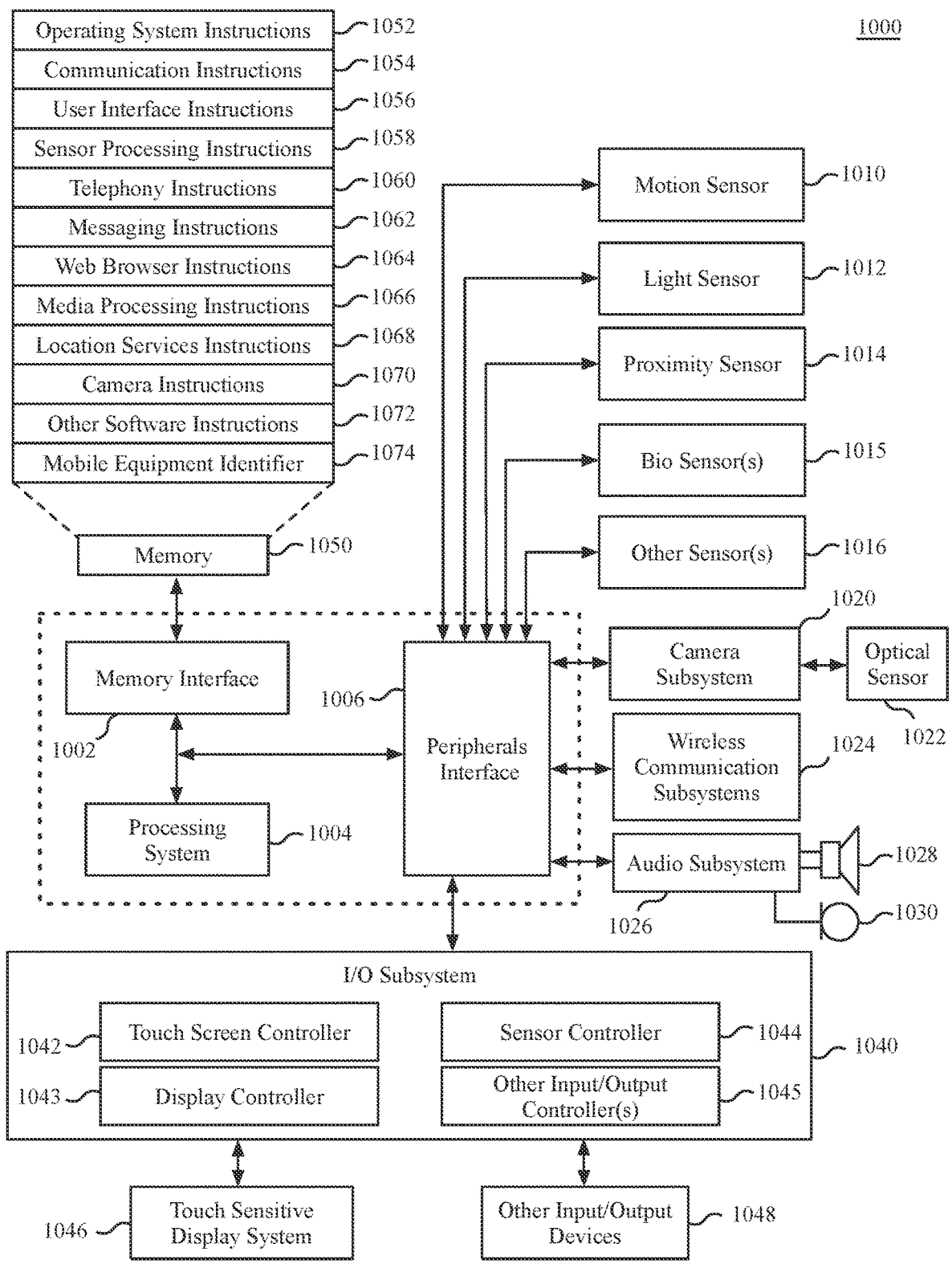
FIG. 10 is a block diagram of a device architecture for a mobile or embedded device, according to an embodiment.

FIG. 10 is a block diagram of a device architecture 1000 for a mobile or embedded device, according to an embodiment. The device architecture 1000 includes a memory interface 1002, a processing system 1004 including one or more data processors, image processors and/or graphics processing units, and a peripherals interface 1006. The various components can be coupled by one or more communication buses or signal lines. The various components can be separate logical components or devices or can be integrated in one or more integrated circuits, such as in a system on a chip integrated circuit.

The memory interface 1002 can be coupled to memory 1050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the mobile device functionality. One or more biometric sensor(s) 1015 may also be present, such as a fingerprint scanner for fingerprint recognition or an image sensor for facial recognition. Other sensors 1016 can also be connected to the peripherals interface 1006, such as a positioning system (e.g., GPS receiver), a temperature sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through a set of wireless communication subsystems 1024, which can include radio frequency receivers and transmitters and/or optical (e.g., infrared) receivers and transmitters. The specific design and implementation of the wireless communication subsystems 1024 can depend on the communication network(s) over which a mobile device is intended to operate. For example, a mobile device including the device architecture 1000 can include wireless communication subsystems 1024 designed to operate over a GSM network, a CDMA network, an LTE network, a Wi-Fi network, a Bluetooth network, or any other wireless network. In particular, the wireless communication subsystems 1024 can provide a communications mechanism over which a media playback application can retrieve resources from a remote media server or scheduled events from a remote calendar or event server.

An audio subsystem 1026 can be coupled to a speaker 1028 and a microphone 1030 to facilitate voice-enabled functions, such as voice recognition, voice replication, digital recording, and telephony functions. In smart media devices described herein, the audio subsystem 1026 can be a high-quality audio subsystem including support for virtual surround sound.

The I/O subsystem 1040 can include a touch screen controller 1042 and/or other input controller(s) 1045. For computing devices including a display device, the touch screen controller 1042 can be coupled to a touch sensitive display system 1046 (e.g., touch-screen). The touch sensitive display system 1046 and touch screen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment, the display controller 1043 can provide frame data to the touch sensitive display system 1046 at a variable frame rate.

In one embodiment, a sensor processor 1044 is included to monitor, control, and/or processes data received from one or more of the motion sensor 1010, light sensor 1012, proximity sensor 1014, or other sensors 1016. The sensor processor 1044 can include logic to interpret sensor data to determine the occurrence of one of more motion events or activities by analysis of the sensor data from the sensors. In one embodiment the sensor processor 1044 also manages the camera subsystem 1020 and audio subsystem 1026, with couple with the sensor processor 1044 via the peripherals interface 1006. Multimedia captured by the camera subsystem 1020 and/or audio subsystem 1026 may be relayed to the memory 1050 to be accessed by software executing on the processing system 1004, or processed by the sensor processor 1044 or other processors in the system to determine environmental metadata. In one embodiment, the sensor processor may configure a live audio stream to a hearing-aid device or wireless earbuds that are connected via a wireless processor, enabling the audio stream to bypass the processing system 1004 and memory 1050.

In one embodiment, the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or navigation instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identity (IMEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

Figure 11:
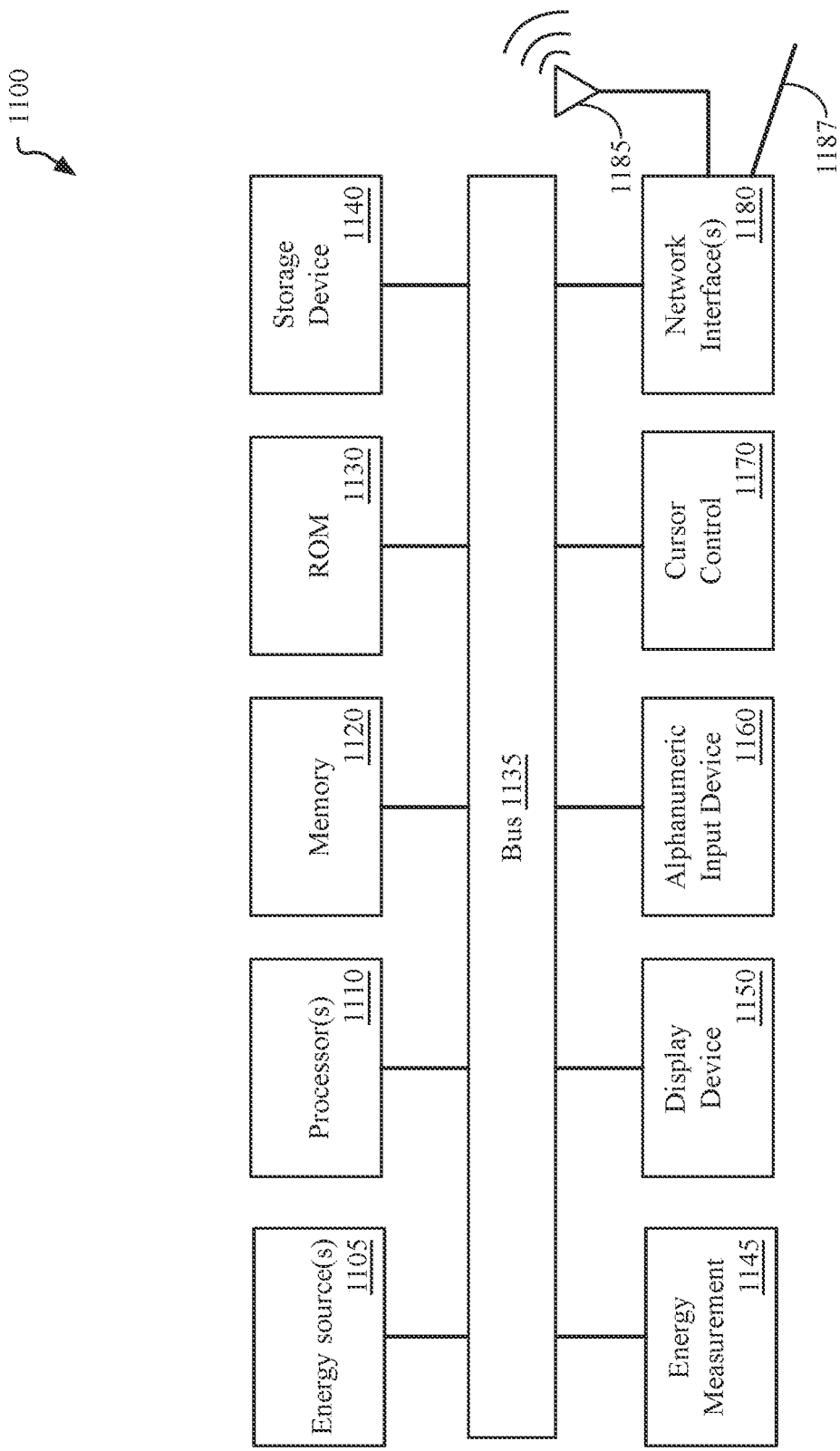
FIG. 11 is a block diagram of a computing system, according to an embodiment.

FIG. 11 is a block diagram of a computing system 1100, according to an embodiment. The illustrated computing system 1100 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1100 can be used to provide the computing device and/or a server device to which the computing device may connect.

The computing system 1100 includes bus 1135 or other communication device to communicate information, and processor(s) 1110 coupled to bus 1135 that may process information. While the computing system 1100 is illustrated with a single processor, the computing system 1100 may include multiple processors and/or co-processors. The computing system 1100 further may include memory 1120, which can be random access memory (RAM) or other dynamic storage device coupled to the bus 1135. The memory 1120 may store information and instructions that may be executed by processor(s) 1110. The memory 1120 may also be used to store temporary variables or other intermediate information during execution of instructions by the processor(s) 1110.

The computing system 1100 may also include read only memory (ROM) 1130 and/or another data storage device 1140 coupled to the bus 1135 that may store information and instructions for the processor(s) 1110. The data storage device 1140 can be or include a variety of storage devices, such as a flash memory device, a magnetic disk, or an optical disc and may be coupled to computing system 1100 via the bus 1135 or via a remote peripheral interface.

The computing system 1100 may also be coupled, via the bus 1135, to a display device 1150 to display information to a user. The computing system 1100 can also include an alphanumeric input device 1160, including alphanumeric and other keys, which may be coupled to bus 1135 to communicate information and command selections to processor(s) 1110. Another type of user input device includes a cursor control 1170 device, such as a touchpad, a mouse, a trackball, or cursor direction keys to communicate direction information and command selections to processor(s) 1110 and to control cursor movement on the display device 1150. The computing system 1100 may also receive user input from a remote device that is communicatively coupled via one or more network interface(s) 1180.

The computing system 1100 further may include one or more network interface(s) 1180 to provide access to a network, such as a local area network. The network interface(s) 1180 may include, for example, a wireless network interface having antenna 1185, which may represent one or more antenna(e). The computing system 1100 can include multiple wireless network interfaces such as a combination of Wi-Fi, Bluetooth®, near field communication (NFC), and/or cellular telephony interfaces. The network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, the network interface(s) 1180 may provide access to a local area network, for example, by conforming to IEEE 1102.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1100 can further include one or more energy sources 1105 and one or more energy measurement systems 1145. Energy sources 1105 can include an AC/DC adapter coupled to an external power source, one or more batteries, one or more charge storage devices, a USB charger, or other energy source. Energy measurement systems include at least one voltage or amperage measuring device that can measure energy consumed by the computing system 1100 during a predetermined period of time. Additionally, one or more energy measurement systems can be included that measure, e.g., energy consumed by a display device, cooling subsystem, Wi-Fi subsystem, or other frequently used or high-energy consumption subsystem.

As described above, one aspect of the present technology is the gathering and use of data available from specific and legitimate sources to improve user experience with respect to granting access to protected resources on a data processing system. The present disclosure contemplates that in some instances, this gathered data may include personal information data regarding application usage patterns for a user. The gathering of such application usage patterns may also inadvertently reveal other information that may be used to uniquely identify the user, such as demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users, for example, to improve the user experience with performing tasks using a data processing system or computing device described herein.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during system configuration or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide a method comprising, on an electronic device having one or more processors and a memory to store a photos library managed by an operating system of the electronic device, receiving a request from an application executing on the one or more processors to access the photos library, in response to the request, configuring virtual photos library for the application. The virtual photos library is a view of the photos library that is specific to the application and includes a first set of multiple assets selected for inclusion in the virtual photos library. The method additionally includes presenting the virtual photos library to the application in response to the request to access the photos library.

Embodiments described herein provide techniques to enable application specific virtual photographic libraries that limit the application's view of the system photos library to a specific set of selected assets. Described herein are techniques to enable limited access to a photos library by enabling application specific virtual photos libraries. When an application requests access to the photos library, the user can select an option to enable or configure a virtual photos library, and then select specific assets (e.g., photos, videos) within the photos library to be selected for inclusion into an application specific virtual photos library.

One embodiment provides for a method comprising, on an electronic device having one or more processors and a memory to store a photos library managed by an operating system of the electronic device, receiving a request from an application executing on the one or more processors to access the photos library, in response to the request, configuring virtual photos library for the application, wherein the virtual photos library is a view of the photos library that is specific to the application and includes a first set of multiple assets selected for inclusion in the virtual photos library, and presenting the virtual photos library to the application in response to the request to access the photos library.

One embodiment provides for an electronic device comprising one or more memory devices to store a photos library and instructions, the instructions associated with an operating system and one or more applications, wherein the photos library is managed by the operating system, a display device to display a graphical interface, and one or more processors to execute the instructions. The instructions can cause the instructions cause the one or more processors to receive a first request at the operating system from a first application, the first request is a request to access the system photos library and display a prompt via the graphical interface, the prompt including a first interface element to enable a first virtual photos library for the first application. The first virtual photos library is a view of the system photos library that is specific to the first application.

In response to receipt of a selection of the interface element to enable the virtual photos library for the first application, the electronic device can display an asset selector via the graphical interface, the asset selector to enable the selection of a first set of multiple assets within the photos library, the first set of multiple assets to be added to the virtual photos library for the first application, configure a first filter for the photos library, the first filter associated with the first application, wherein the first filter is to limit access by the first application to the first set of multiple assets, and present a filtered view of the photos library based on the first filter.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A method comprising:
    receiving, by a process and via an application programming interface (API) call from a first application executing on one or more processors of an electronic device, a request to access a library of data items having a data type;
    in response to the request, providing, by the process and to the first application via the API, a user interface for receiving a selection of a first set of the data items having the data type;
    receiving, by the process and via the user interface, the selection of the first set of the data items having the data type;
    configuring, by the process, a first virtual library for the first application, wherein the first virtual library is a view of the library that corresponds to the selected first set of the data items having the data type and is specific to the first application; and
    providing, via the API, access to the first virtual library to the first application in response to the request to access the library.

2. The method of claim 1, further comprising configuring a first filter for the library, wherein the first filter limits access by the first application to the selected first set of the data items having the data type.

3. The method of claim 1, further comprising:
    receiving a request from a second application executing on the one or more processors to access the library; and
    in response to the request, configuring a second virtual library for the second application, wherein the second virtual library is a view of the library that is specific to the second application.

4. The method of claim 3, wherein the second virtual library includes a second set of the data items having the data type selected for inclusion in the second virtual library.

5. The method of claim 4, wherein configuring the second virtual library for the second application includes presenting an interface to enable selection of the data items having the data type within the library and receiving, via the interface, an input selecting the second set of the data items having the data type.

6. The method of claim 5, further comprising configuring a second filter for the library, wherein the second filter limits access by the second application to the second set of the data items having the data type.

7. The method of claim 6, wherein the data type comprises images and the method further comprises:
    capturing an image via the second application;
    adding the image to the library;
    updating the second filter to add the image to the second virtual library;
    presenting the image to the second application as an entry in the second virtual library of the second application; and
    blocking presentation of the image to the first application.

8. The method of claim 1, wherein the library comprises a multimedia library and the first virtual library comprises a first virtual multimedia library.

9. An electronic device comprising:
    a memory; and
    one or more processors to execute instructions, wherein the instructions cause the one or more processors to:
        receive, by a process and via an application programming interface (API) call from a first application, a first request to access a library of data items having a data type;
        provide, by the process and to the first application via the API, a graphical interface for receiving a selection of a first set of the data items having the data type via a prompt comprising a first interface element;
        receive, by the process and via the graphical interface, the selection of the first set of the data items having the data type; and
        configure, by the process, a first virtual library for the first application, wherein the first virtual library is a view of the library that corresponds to the selected first set of the data items having the data type and is specific to the first application.

10. The electronic device of claim 9, wherein the prompt additionally includes a second interface element to enable unfiltered access to the library.

11. The electronic device of claim 9, wherein the instructions further cause the one or more processors to, in response to receipt of a selection of the first interface element:
   display a first asset selector via the graphical interface, the first asset selector to enable the selection of the first set of data items having the data type within the library, the first set of data items having the data type to be added to the first virtual library;
   configure a first filter for the library, the first filter associated with the first application, wherein the first filter is to limit access by the first application to the first set of data items having the data type within the library; and
   present a first filtered view of the library based on the first filter as the first virtual library in response to a second request by the first application to access the library.

12. The electronic device of claim 11, wherein the instructions further cause the one or more processors to:
   receive a second request by the process from a second application, the second request to access the library; and
   display the prompt via the graphical interface, the prompt including the first interface element, wherein a second virtual library is a view of the that is specific to the second application.

13. The electronic device of claim 12, wherein the instructions further cause the one or more processor to, in response to receipt of a selection of the first interface element:
   display a second asset selector via the graphical interface, the second asset selector to enable the selection of a second set of the data items having the data type within the library, the second set of the data items having the data type to be added to the second virtual library;
   configure a second filter for the library, the second filter associated with the second application, wherein the second filter is to limit access by the second application to the second set of data items having the data type within the library; and
   present a second filtered view of the library based on the second filter as the second virtual library in response to a third request by the second application to access the library.

14. The electronic device of claim 13, wherein the second asset selector differs from the first asset selector, the second asset selector generated by the second application.

15. The electronic device of claim 13, wherein the data type comprises images and the instructions further cause the one or more processors to:
   capture an image via the second application;
   add the image to the library;
   update the second filter to add the image to the second virtual library;
   present the image to the second application as an entry in the second virtual library of the second application; and
   block presentation of the image to the first application.

16. The electronic device of claim 9, wherein the library comprises a multimedia library and the first virtual library comprises a first virtual multimedia library.

17. A non-transitory machine-readable medium storing instructions to cause one or more processors of an electronic device to perform operations comprising:
   receiving, by a process executing on the electronic device and via an application programming interface (API) call from a first application executing on the electronic device, a request to access a library of data items having a data type that is managed by the process;
   in response to the request, providing, by the process and to the first application via the API, a user interface for receiving a selection of a first set of the data items having the data type;
   receiving, by the process and via the user interface, the selection of the first set of the data items having the data type;
   configuring, by the process, a first virtual library for the first application, wherein the first virtual library is a view of the library that corresponds to the selected first set of the data items having the data type and is specific to the first application; and
   providing, via the API, access to the first virtual library to the first application in response to the request to access the library.

18. The non-transitory machine-readable medium of claim 17, wherein the library comprises a multimedia library and the first virtual library comprises a first virtual multimedia library.

19. The non-transitory machine-readable medium of claim 17, the operations further comprising:
   receiving a request from a second application executing on the one or more processors to access the library; and
   in response to the request, configuring a second virtual library for the second application, wherein the second virtual library is a view of the library that is specific to the second application, wherein the second virtual library includes a second set of the data items having the data type selected for inclusion in the second virtual library, configuring the second virtual library for the second application includes presenting an interface to enable selection of the data items having the data type within the library and receiving, via the interface, an input selecting at least the second set of the data items having the data type, and configuring a second filter for the library, wherein the second filter limits access by the second application to the second set of the data items having the data type.

20. The non-transitory machine-readable medium of claim 19, wherein the data type comprises images and the operations further comprise:
   capturing an image via the second application;
   adding the image to the library;
   updating the second filter to add the image to the second virtual file library;
   presenting the image to the second application as an entry in the second virtual library of the second application; and
   blocking presentation of the image to the first application.

* * * * *

UNITED STATES PATENT AND TRADEMARK OFFICE
CERTIFICATE OF CORRECTION

| | | |
|---|---|---|
| PATENT NO. | : 12,158,911 B2 | Page 1 of 1 |
| APPLICATION NO. | : 18/130395 | |
| DATED | : December 3, 2024 | |
| INVENTOR(S) | : Matthew J. Dickoff et al. | |

It is certified that error appears in the above-identified patent and that said Letters Patent is hereby corrected as shown below:

In the Claims

Column 19, Line 27 (Claim 12): Replace "the that is specific to the" with --the library that is specific to the--;

Column 20, Line 56 (Claim 20): Replace "virtual file library" with --virtual library--.

Signed and Sealed this
Eleventh Day of February, 2025

Coke Morgan Stewart
*Acting Director of the United States Patent and Trademark Office*